(12) United States Patent
Hacker et al.

(10) Patent No.: US 10,759,243 B2
(45) Date of Patent: Sep. 1, 2020

(54) WHEEL SUSPENSION

(71) Applicant: ZF Friedrichshafen AG, Friedrichshafen (DE)

(72) Inventors: Clemens Hacker, Osnabrück (DE); Knut Heidsieck, Bünde (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 27 days.

(21) Appl. No.: 16/065,312

(22) PCT Filed: Dec. 8, 2016

(86) PCT No.: PCT/EP2016/080204
§ 371 (c)(1),
(2) Date: Jun. 22, 2018

(87) PCT Pub. No.: WO2017/118514
PCT Pub. Date: Jul. 13, 2017

(65) Prior Publication Data
US 2019/0126702 A1    May 2, 2019

(30) Foreign Application Priority Data
Jan. 7, 2016    (DE) .................. 10 2016 200 096

(51) Int. Cl.
*B60G 7/02* (2006.01)
*B60G 7/00* (2006.01)
(Continued)

(52) U.S. Cl.
CPC ............... *B60G 7/001* (2013.01); *B60G 3/18* (2013.01); *B60G 3/28* (2013.01); *B60G 7/005* (2013.01);
(Continued)

(58) Field of Classification Search
CPC .......... B60G 7/001; B60G 7/00; B60G 7/005; B60G 7/02; B60G 3/28; B60G 3/18;
(Continued)

(56) References Cited

U.S. PATENT DOCUMENTS

| 4,828,279 A | 5/1989 | Matschinsky |
| 4,903,981 A | 2/1990 | Alesso et al. |

(Continued)

FOREIGN PATENT DOCUMENTS

| DE | 37 40 310 A1 | 6/1989 |
| DE | 38 75 336 T2 | 3/1993 |

(Continued)

OTHER PUBLICATIONS

International Search Report Corresponding to PCT/EP2016/080214 dated Feb. 9, 2017.
(Continued)

*Primary Examiner* — Keith J Frisby
(74) *Attorney, Agent, or Firm* — Davis & Bujold PLLC; Michael J. Bujold

(57) ABSTRACT

A wheel suspension (1) for a motor vehicle, having a wheel carrier (3) which is mounted so that the wheel carrier (3) can pivot relative to a wheel-guiding control arm (4). The wheel-guiding control arm (4) includes a longitudinal control arm section (4a) with a forward body-side bearing (11) and a transverse control arm section (4b) with a rear body-side bearing (12). The rear body-side bearing (12) is designed as a ball joint.

16 Claims, 5 Drawing Sheets

(51) Int. Cl.
*B60G 3/28* (2006.01)
*B60G 3/18* (2006.01)

(52) U.S. Cl.
CPC .............. *B60G 7/008* (2013.01); *B60G 7/02* (2013.01); *B60G 2200/144* (2013.01); *B60G 2200/1424* (2013.01); *B60G 2200/154* (2013.01); *B60G 2200/184* (2013.01); *B60G 2204/1431* (2013.01); *B60G 2204/416* (2013.01); *B60G 2204/422* (2013.01); *B60G 2206/12* (2013.01); *B60G 2206/122* (2013.01); *B60G 2206/15* (2013.01)

(58) Field of Classification Search
CPC .................. B60G 3/20; B60G 2206/12; B60G 2206/122; B60G 2206/15; B60G 2200/184; B60G 2200/14; B60G 2200/154; B60G 2200/144; B60G 2200/142; B60G 2200/1422; B60G 2200/1424; B60G 2204/422; B60G 2204/416; B60G 2204/1431; B60G 2204/143
USPC .................................. 280/124.134, 124.135
See application file for complete search history.

(56) References Cited

U.S. PATENT DOCUMENTS

| | | |
|---|---|---|
| 4,981,308 A | 1/1991 | Kunert et al. |
| 5,380,024 A | 1/1995 | Hayami |
| 5,845,926 A | 12/1998 | Davis et al. |
| 8,286,979 B2 | 10/2012 | Schote |
| 9,733,762 B2 | 8/2017 | Backes |
| 2011/0291376 A1 | 12/2011 | Allen et al. |
| 2015/0183286 A1 | 7/2015 | Bruehl et al. |
| 2016/0339753 A1 | 11/2016 | Wallgren |

FOREIGN PATENT DOCUMENTS

| | | | |
|---|---|---|---|
| DE | 697 24 403 T2 | | 6/2004 |
| DE | 697 35 117 T2 | | 7/2006 |
| DE | 69735117 T2 | * | 7/2006 |
| DE | 10 2010 012 014 A1 | | 9/2011 |
| DE | 10 2011 101 782 A1 | | 11/2012 |
| DE | 10 2012 011 865 A1 | | 12/2013 |
| DE | 10 2013 211 535 A1 | | 12/2014 |
| DE | 102013211535 A1 | * | 12/2014 |
| EP | 1 870 263 A2 | | 12/2007 |
| EP | 1870263 A2 | * | 12/2007 |
| EP | 1 995 087 A2 | | 11/2008 |
| JP | S61-139504 A | | 6/1986 |

OTHER PUBLICATIONS

International Search Report Corresponding to PCT/EP2016/080204 dated Feb. 9, 2017.
Written Opinion Corresponding to PCT/EP2016/080214 dated Feb. 9, 2017.
Written Opinion Corresponding to PCT/EP2016/080204 dated Feb. 9, 2017.

* cited by examiner

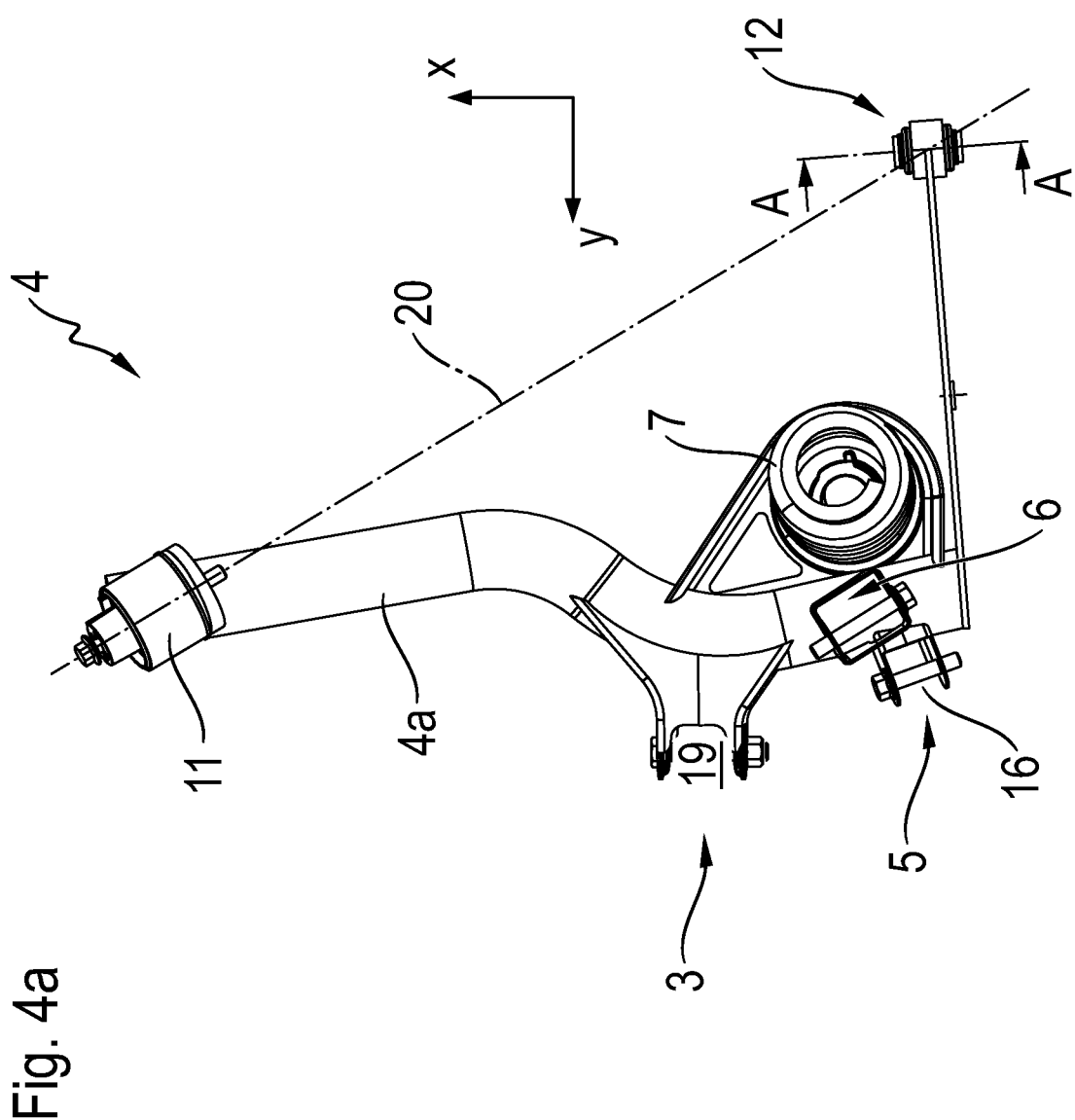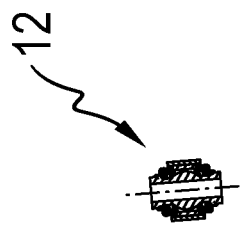

WHEEL SUSPENSION

This application is a National Stage completion of PCT/EP2016/080204 filed Dec. 8, 2016, which claims priority from German patent application serial no. 10 2016 200 096.9 filed Jan. 7, 2016.

FIELD OF THE INVENTION

The invention relates to a wheel suspension for a motor vehicle and to a wheel-guiding control arm.

BACKGROUND OF THE INVENTION

Wheel suspensions for motor vehicles are known from the prior art. In this connection reference should be made to DE 10 2013 211 535 A1, which discloses a steerable rear-wheel suspension for a motor vehicle. The wheel suspension described therein comprises, among other things, a wheel-guiding control arm with a longitudinal control arm section and a transverse control arm section, wherein the longitudinal control arm section is provided with a forward bearing on the body side and the transverse control arm section is provided with a rear bearing farther inside in relation thereto on the body side. The essentially L-shaped wheel-guiding control arm so formed can pivot relative to the vehicle body about a rotational axis that extends through the forward body-side bearing and the rear body-side bearing. As can be seen for example in FIG. 4 of the document, the transverse control arm section of the wheel-guiding control arm is in the form of a so-termed "blade" on the end of which directed toward the middle of the vehicle, the rear body-side bearing is formed. No more exact design features of this bearing, which is represented only by a hole, are to be found in the document.

SUMMARY OF THE INVENTION

A purpose of the present invention is to indicate a wheel suspension of the type described to begin with, by virtue of which on the one hand sufficient longitudinal comfort can be obtained and in addition the secondary spring rate is reduced. Furthermore, high transverse rigidity and camber stiffness should be achieved.

The objective is achieved by a wheel suspension having the characteristics specified in the independent claims. According to the invention, a wheel suspension for a vehicle is described, which comprises a wheel carrier fitted so that it can pivot relative to a wheel-guiding control arm, such that the wheel-guiding control arm has a longitudinal control arm section with a forward body-side bearing and a transverse control arm section with a rear body-side bearing, wherein the rear body-side bearing is in the form of a ball joint.

To achieve sufficient longitudinal comfort, it is generally known to connect longitudinal control arms to the body by means of a rubber bearing so that, for example during a braking process, the longitudinal control arm will have a degree of compliance in the longitudinal direction of the vehicle relative to the vehicle body. To enable such longitudinal compliance, for example in the wheel suspensions known from DE 10 2103 211 535 A1 the transverse section of the wheel-guiding control arm is in the form of a sheet that can bend in the longitudinal direction of the vehicle (also called a "blade"), so that it can deform in the longitudinal direction of the vehicle when the vehicle is braked. Since in addition the longitudinal control arm section is connected to the body by means of a rubber bearing, when the transverse control arm section is deformed at least the longitudinal control arm section of the wheel-guiding control arm is slightly compliant in the longitudinal direction of the vehicle, and this contributes toward increasing the driving comfort of the vehicle.

According to the invention, it is proposed to design the rear body-side bearing of the transverse control arm section in the form of a ball joint. The advantage of this is that the rear body-side bearing then allows the wheel-guiding control arm to spring in and out almost without resistance, whereby the secondary spring rate (i.e. the rigidity that opposes spring movement of the wheel-guiding control arm, disregarding the elastic rigidity of the vehicle body) of the wheel suspension is particularly low. This is because the cardanic freedom of a ball joint allows compression and expansion movements of the wheel-guiding control arm, i.e. rotations of the wheel-guiding control arm about a rotational axis that extends through the respective forward and rear body-side bearings, almost with no restoring force.

Besides reducing the secondary spring rate, this also results in an overall reduction of the stressing of the transverse control arm section of the wheel-guiding control arm, since during operation-related compression and expansion movements the transverse control arm section is not twisted. Due to the elastic deformability of the transverse control arm section of the wheel-guiding control arm, a desired level of longitudinal comfort of the wheel suspension can be ensured regardless of the compression and expansion movements. The use of a ball joint in accordance with the invention for the rear body-side bearing also results in elevated camber stiffness of the wheel suspension, since the ball joint prevents both axial movements of the wheel-guiding control arm along its rotational axis and also radial movements transverse to the rotational axis.

In a preferred further development of the wheel suspension, the wheel-guiding control arm is essentially L-shaped, in that its longitudinal control arm section forms the longer arm and the transverse control arm section forms the shorter arm of an "L". It should be pointed out that in this context the expression "essentially L-shaped" can be interpreted broadly, in particular meaning that the longitudinal control arm section and the transverse control arm section are each of a certain length and are connected approximately at right-angles to one another. The longitudinal control arm section or the transverse control arm section do not necessarily have to be straight over their full length but, for example to suit fitting-space requirements, can also deviate from a purely rectilinear shape. Due to the overall approximately L-shaped form of the wheel-guiding control arm it can also be called a trapezoidal control arm.

As already explained, the longitudinal control arm section of the wheel-guiding control arm is provided with a forward bearing on the body side and the transverse control arm section with a rear bearing on the body side. According to a preferred design feature, the rear body-side bearing of the wheel-guiding control arm is arranged closer to the middle of the vehicle, in relation to a transverse direction of the vehicle, than is the forward body-side bearing, which in particular produces an arrangement in which the rotational axis of the wheel-guiding control arm is inclined at an angle relative to the longitudinal direction of the vehicle. Thus, from the kinematic standpoint the wheel-guiding control arm is a so-termed "oblique control arm".

Since according to a preferred further development of the wheel suspension the forward body-side bearing is in the form of an elastomer bearing, the wheel suspension provides particularly great driving comfort. In particular, the design of the forward body-side bearing as an elastomer bearing makes it possible for the wheel-guiding control arm to move slightly (to be compliant) relative to the vehicle body in the longitudinal direction of the vehicle.

The orientation of the rear body-side bearing can be realized in various ways. A particularly simple production method is achieved if the rear body-side bearing is arranged on the transverse control arm section in such manner that a bearing axis of the ball joint is directed perpendicularly to the longitudinal extension of the transverse control arm section.

According to an advantageous further development of the wheel suspension, in contrast the rear body-side bearing could be orientated parallel to a rotational axis of the wheel-guiding control arm that extends through the body-side bearing. In practice the bearing axis of the rear body-side bearing made as a ball bearing then coincides with the rotational axis of the wheel-guiding control arm. By virtue of this arrangement it can advantageously be ensured that in the uncompressed condition of the wheel-guiding control arm (zero position) the ball joint is in an undeflected condition. Thus, for operation a maximum ability to be deflected remains for operational purposes.

A preferred further development of the invention provides that the wheel-guiding control arm is connected, via the rear body-side bearing, to an axle carrier and via the forward body-side bearing to the vehicle body. Alternatively, the forward body-side bearing could also be connected to the axle carrier, whereby the fitting of the wheel suspension as a complete assembly to the vehicle body can be simplified. On the other hand, a connection of the forward body-side bearing directly to the vehicle body has the advantage that the axle carrier can be made smaller, so that it may be possible to use already existing connection points to the vehicle body. Alternatively, both the rear body-side bearing and also the forward body-side bearing could be connected directly to the vehicle body.

To achieve sufficient longitudinal comfort of the wheel suspension, it is advantageously provided that the transverse control arm section of the wheel-guiding control arm has a substantially greater elasticity in relation to the driving direction than in the vertical or transverse directions of the vehicle. In particular this can be achieved by making the transverse control arm section of the wheel-guiding control arm in the form of a sheet that can bend in the longitudinal direction of the vehicle (also called a "blade").

As a general design feature of the wheel suspension, the wheel carrier is generally mounted so that it can pivot relative to the wheel-guiding control arm. A preferred further development of the wheel suspension provides that the wheel carrier is connected to the wheel-guiding control arm in a first connection area directly, in particular by a ball joint, and in a second connection area indirectly via an integral joint. Thus, the wheel carrier and the wheel-guiding control arm are connected to one another in two connection areas such that in the first connection area the connection is direct and in the second connection area the connection is indirect. For example, in the first connection area a ball joint or a rubber mounting could be used, whereby three rotational degrees of freedom can be realized between the wheel carrier and the wheel-guiding control arm. In the second connection area an integral joint is used, this being in particular a link component, for example a two-point link one end of which is connected by a hinge to the wheel carrier and the other end via a hinge to the wheel-guiding control arm. With an appropriate design and arrangement of the connection areas the effect can be produced that the wheel carrier can pivot about a virtual pivoting axis relative to the wheel-guiding control arm.

Expediently, the two connection areas are in this case a distance apart in the longitudinal direction of the vehicle, preferably with one of the areas in front of the wheel center and the other behind the wheel center. In that way a sufficiently large distance between the first and second connection areas can be provided, whereby the supporting forces acting upon the integral joint can be reduced.

The wheel suspension can be made particularly compact if, in the undeflected state of the wheel carrier, the integral joint extends essentially in the vertical direction of the vehicle. Furthermore, this enables an approximately equally sized maximum positive or negative steering angle to be produced.

To achieve the smallest possible secondary spring rate of the wheel suspension, according to an advantageous further development the axes of the link of the integral joint, as the wheel suspension is viewed from above, are orientated approximately parallel to the rotational axis of the wheel-guiding control arm.

Also in order to reduce the secondary spring rate, according to another advantageous design of the wheel suspension the axes of the hinge of the integral joint, when the wheel suspension is viewed from the side, are orientated so that they intersect at a point forward of the wheel center in relation to the longitudinal direction of the vehicle, so that the axis of the joint-side hinge of the integral joint, when the wheel suspension is viewed from the side, is orientated preferably approximately parallel to the rotational axis of the wheel-guiding control arm.

The result of the orientation described for the hinge axes of the integral joint is that the mountings of the integral joint, preferably elastomer mountings, are hardly stressed at all in a cardanic manner, and this too contributes toward reducing the secondary spring rate of the wheel suspension. In addition this also prolongs the useful life of the elastomer mountings. Moreover, thanks to the lower secondary spring rate the vehicle can be better controlled.

Expediently, the wheel carrier is also connected to an axle carrier and/or the body by way of a camber link, such that the camber link is associated with an upper link plane and the wheel-guiding control arm with a link plane lower down. In that way the wheel suspension as a whole can be made more compact.

To steer the wheel carrier about a steering axis, it is advantageous for steering means to be associated with the wheel suspension, which is advantageously connected to the wheel carrier behind the wheel center. Basically, this can be steering means of various types.

According to a preferred further development of the wheel suspension the steering means are in the form of a track control link which for active steering can be actuated by an actor. The actuation by means of an actor then brings about in particular translational movement of the track control link in the transverse direction of the vehicle, in order to produce by means of the movement of the track control link steering movement of the wheel carrier and the wheel fitted onto it.

Alternatively, it is conceivable for the steering means to be a track rod for passive steering by way of the wheel stroke. In this way the wheel suspension can be designed particularly inexpensively.

The wheel suspension can be made particularly compactly if the steering means are connected, in particular directly, to the wheel carrier. In that way, by virtue of a direct engagement of the steering means with the wheel carrier, particularly precise steering of the wheel carrier about its steering axis can take place. In this case the steering means are advantageously arranged behind the wheel center, whereby sufficient structural space for driving the wheels is provided. Alternatively the steering means can co-operate indirectly with the wheel carrier, for example if the steering means are connected to the integral joint.

Since the transverse control arm section of the wheel-guiding control arm is preferably positioned behind the wheel center, sufficient structural space for possible drive means can be provided in the area of the wheel center. Advantageously, the longitudinal control arm section of the wheel-guiding control arm extends as far as in front of the wheel center. By virtue of the longitudinal control arm section, in particular braking torques and acceleration torques or forces that occur can be supported.

Besides the wheel suspension described, the invention also relates to a wheel-guiding control arm according to the characteristics specified in the independent claims. This wheel-guiding control arm is particularly suitable for mounting a wheel carrier of a wheel suspension as described earlier. The wheel-guiding control arm according to the invention has a longitudinal control arm section and a transverse control arm section, each with a bearing at its end, and is characterized in that the bearing at the end of the transverse control arm section is in the form of a ball joint. To avoid repetition, for the other advantageous design features of the wheel-guiding control arm reference should be made to the rest of the description.

BRIEF DESCRIPTION OF THE DRAWINGS

Below, the invention is explained in greater detail with reference to an example embodiment illustrated in the drawing, from which further advantageous effects of the invention emerge. The drawing below show:

FIG. 4a: A detailed representation of a wheel-guiding control arm used in the wheel suspension according to the first example embodiment, viewed from above, FIG. 4b: A sectioned view of a ball-and-socket joint used with the wheel-guiding control arm shown in FIG. 4a, FIG. 5: A view from above, of a wheel suspension according to a second example embodiment.

DETAILED DESCRIPTION OF THE PREFERRED EMBODIMENTS

FIGS. 1 to 4b show various aspects of a first example embodiment of a wheel suspension 1 for a motor vehicle according to the invention, which are explained below. Since the figures all relate to the first example embodiment of the invention, in the figures the same components are denoted by the same indexes so that statements made about any index or its corresponding component apply just as well to all the figures and thus do not have to be repeated for every figure. In all the figures orientations are defined by indicating a coordinate system, wherein x is the longitudinal direction of the vehicle, y its transverse direction and z its vertical direction.

Figure 1:
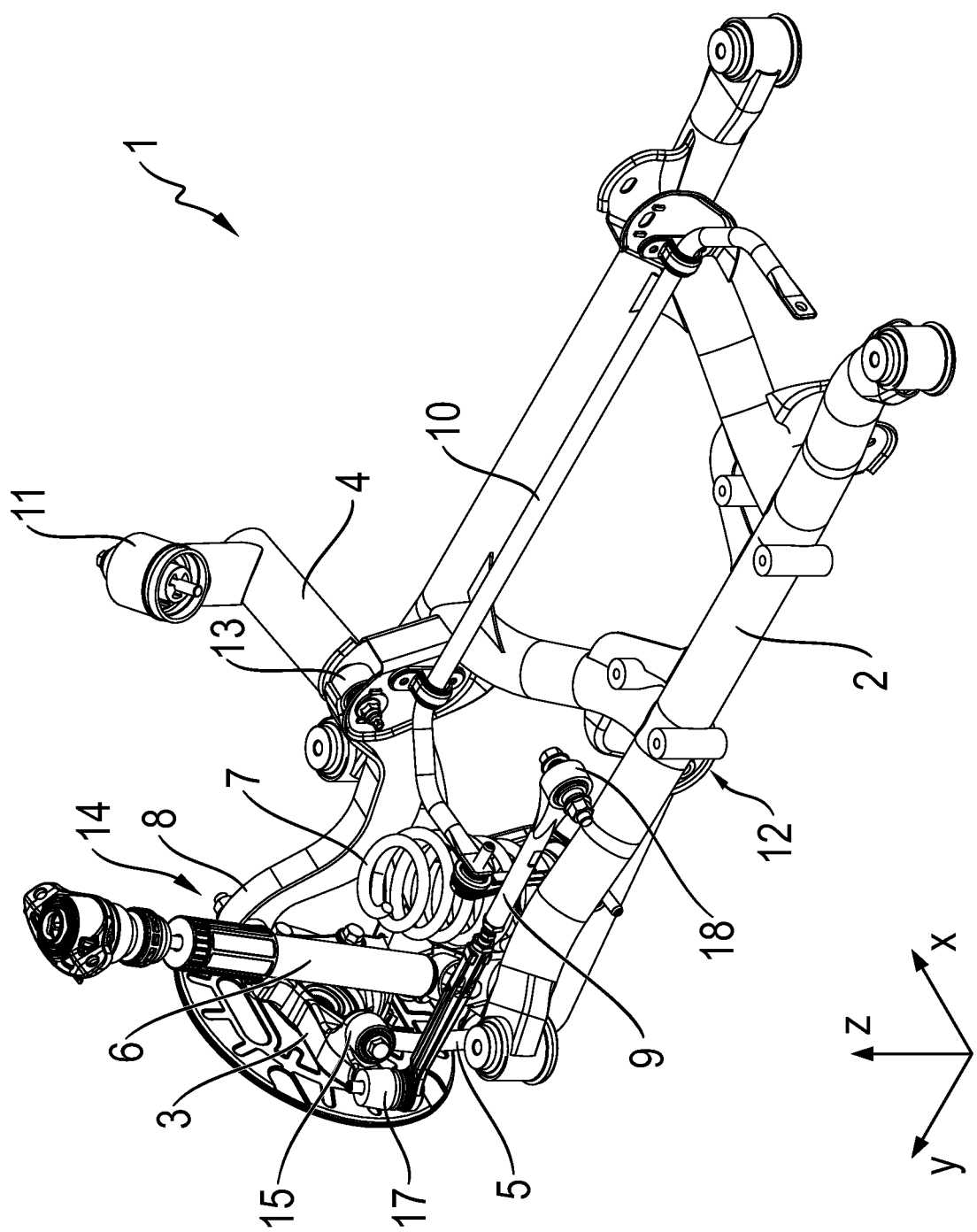
FIG. 1: A perspective view of a wheel suspension according to a first example embodiment, viewed obliquely from behind.

FIG. 1 shows a wheel suspension 1 for a motor vehicle fitted onto an axle carrier 2, wherein for the sake of simplicity only the wheel suspension 1 on the left—relative to a motor vehicle (not shown) is fitted. The axle carrier 2 on which the wheel suspension 1 is fitted consists essentially of four tubes welded to one another, of which a forward and a rear tube extend essentially in the transverse direction and the, by comparison, shorter tubes that extend essentially in the longitudinal direction of the vehicle are welded to them to form a rigid frame. At the outer ends of the tubes extending in the transverse direction of the vehicle there are in the usual manner four connection points via which the axle carrier 2 can be fitted onto a body (not shown) of a motor vehicle, again in a manner known as such.

The wheel suspension 1 shown comprises a wheel carrier 3 mounted so that it can pivot relative to a wheel-guiding control arm 4. The wheel-guiding control arm 4 is an essentially L-shaped component comprising a longitudinal control arm section 4a and a transverse control arm section 4b. In this connection reference should be made to FIG. 4a, which shows a detailed representation of the wheel-guiding control arm viewed from above. From this it can be seen that the wheel-guiding control arm 4 is formed essentially by a tubular component forming the longitudinal control arm section 4a and, connected solidly to it, a blade-like component that forms the transverse control arm section 4b. Whereas due to its tubular structure the longitudinal control arm section 4a is particularly resistant to distortion, the transverse control arm section 4b, particularly in relation to the longitudinal direction x of the vehicle, has a comparatively high elasticity and therefore flexibility. Whereas the wheel-guiding control arm 4 as a whole can be regarded as a substantially L-shaped component of which the longitudinal control arm section 4a forms the longer arm of an "L" while the transverse control arm section 4b forms the shorter arm of the "L", the longitudinal control arm section 4a, despite its essentially elongated extension has a shape slightly resembling an "S" (with consecutive right-hand and left-hand curvatures). This S-shape makes it possible for a hinge holder 19 for the wheel carrier 3 to be arranged particularly close to the wheel (on the outside of the vehicle), whereas at the same time in an area farther forward (relative to the longitudinal direction x of the vehicle) and curved inward there is sufficient space for a wheel mounted on the wheel carrier 3. Located farther inside relative to the longitudinal direction x of the vehicle, on the longitudinal control arm section 4a close to the L-angle a recess for a control-arm-side hinge 16 for an integral joint 5 still to be explained is provided. In addition, in this part of the longitudinal control arm section 4a there is a lower recess for a damper 6. Furthermore, in the L-angle formed by the tubular longitudinal control arm section 4a and the blade-like transverse control arm section 4b, a holder plate is arranged, which serves to support a spiral spring 7 (shown in FIGS. 1 and 2) at the bottom.

As can also be seen in FIG. 4a, the wheel-guiding control arm 4 has at the forward end of the longitudinal control arm section 4a, a forward body-side bearing 11. This forward body-side bearing 11 is in the form of an elastomer bearing, and its bearing axis is inclined at an inclination angle α (see FIG. 2) relative to the longitudinal direction x of the vehicle, as shown in FIG. 2.

Referring again to FIG. 4a, it can be seen from the representation therein that the wheel-guiding control arm 4 has a rear body-side bearing 12 at the end of the transverse control arm section 4b facing toward the inside of the vehicle. This rear body-side bearing 12 is in the form of a ball-and-socket joint.

FIG. 4b shows a sectioned representation of the rear body-side bearing 12 of the transverse control arm section 4b of the wheel-guiding control arm, which bearing 12 is in the form of a ball-and-socket bearing.

Figure 2:
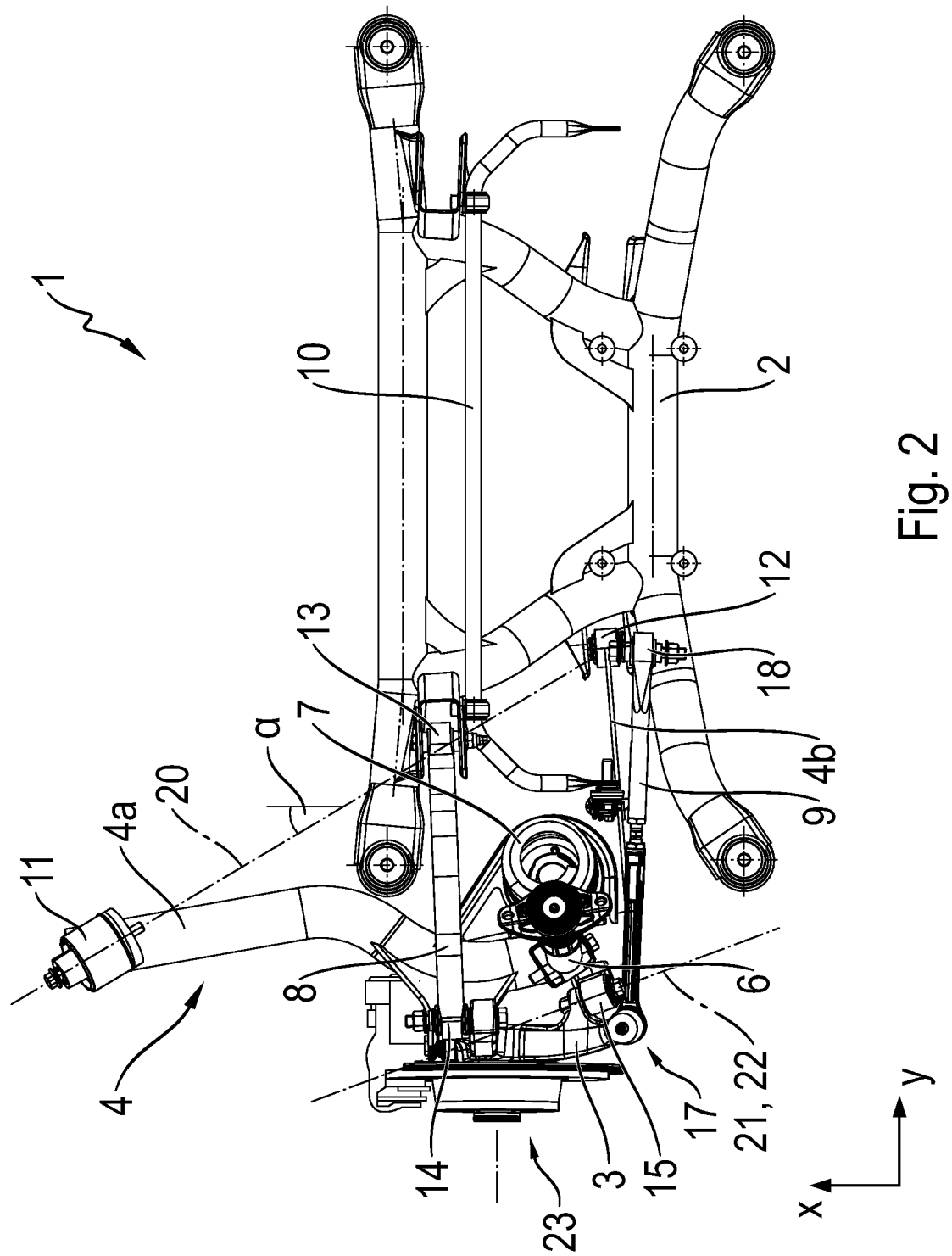
FIG. 2: A view from above, of the wheel suspension according to the first example embodiment.

As can be seen in FIG. 2, the wheel-guiding control arm 4 is connected directly to the vehicle body or the axle carrier 2 (including the vehicle body) by way of the forward body-side bearing 11 and the rear body-side bearing 12. Consequently the wheel-guiding control arm 4 can pivot relative to the vehicle body about the rotational axis 20, whereby compression of the wheel-guiding control arm 4 (together with the wheel carrier 3 connected thereto) is made possible. Since in relation to the transverse direction y of the vehicle the rear body-side bearing 12 of the wheel-guiding control arm 4 is closer to the middle of the vehicle than is the forward body-side bearing 11, the rotational axis 20 of the wheel-guiding control arm 4 is inclined by an angle α relative to the longitudinal direction x of the vehicle.

In the example embodiment described here the wheel-guiding control arm 4 is connected to the axle carrier 2 by the rear body-side bearing 12, whereas the forward body-side bearing 11 is connected directly to the vehicle body (not shown). According to a conceivable alternative design the axle carrier 2 could also be designed such that the forward body-side bearing 11 too is connected to the axle carrier. The kinematics of the mounting of the wheel-guiding control arm 4 would not be influenced by this.

As already mentioned in connection with FIG. 4a, in relation to the longitudinal direction x the transverse control arm section 4b of the wheel-guiding control arm 4 has substantially greater elasticity than in the vertical direction z or in the transverse direction y of the vehicle. As can best be seen from FIGS. 2 and 4a, the transverse control arm section 4b of the wheel-guiding control arm 4 is designed in the form of a "blade". Furthermore the forward body-side bearing 11 of the wheel-guiding control arm 4 has some compliance in the direction of the bearing axis (which coincides with the rotational axis 20). The relatively high elasticity of the transverse control arm section 4b and the longitudinal compliance of the forward body-side bearing 11 contribute toward allowing the longitudinal control arm 4, when an impact occurs in the longitudinal direction of the vehicle, to move at least to a certain extent in the longitudinal direction of the vehicle with deformation of the transverse control arm section 4b of the wheel-guiding control arm 4, whereby the longitudinal comfort of the wheel suspension 1 is increased. The design of the rear body-side bearing 12 as a ball-and-socket joint in this case advantageously ensures that the transverse control arm section 4b is not, or is hardly deformed when the wheel-guiding control arm 4 is compressed or expanded. Due to the design of the ball-and-socket joint, no appreciable wear takes place at the rear body-side bearing 12 and there is a slight decrease of the secondary spring rate of the wheel suspension 1. Thanks to the still existing longitudinal mobility (deformability of the longitudinal control arm section 4a) the longitudinal comfort of the wheel suspension 1 remains high.

As already mentioned earlier, the wheel carrier 3 is mounted so that it can pivot relative to the wheel-guiding control arm 4. For that purpose, in the example embodiment of the wheel suspension 1 illustrated, the wheel carrier 3 is connected to the wheel-guiding control arm 4 at two connection areas, so that the wheel carrier 3 can pivot about a virtual pivoting axis relative to the wheel-guiding control arm 4. An imaginary connection line between a hinge holder 19 and a hinge 14 of a camber link 8 on the wheel carrier side in this case represents the virtual pivoting axis of the wheel carrier 3.

As already mentioned in connection with FIG. 4a, on the longitudinal control arm section 4a of the wheel-guiding control arm 4 a hinge holder 19 is formed for receiving a ball joint, which serves to connect the wheel carrier 3 in this first connection area 19 to the wheel-guiding control arm 4 in an articulated manner.

Figure 3:
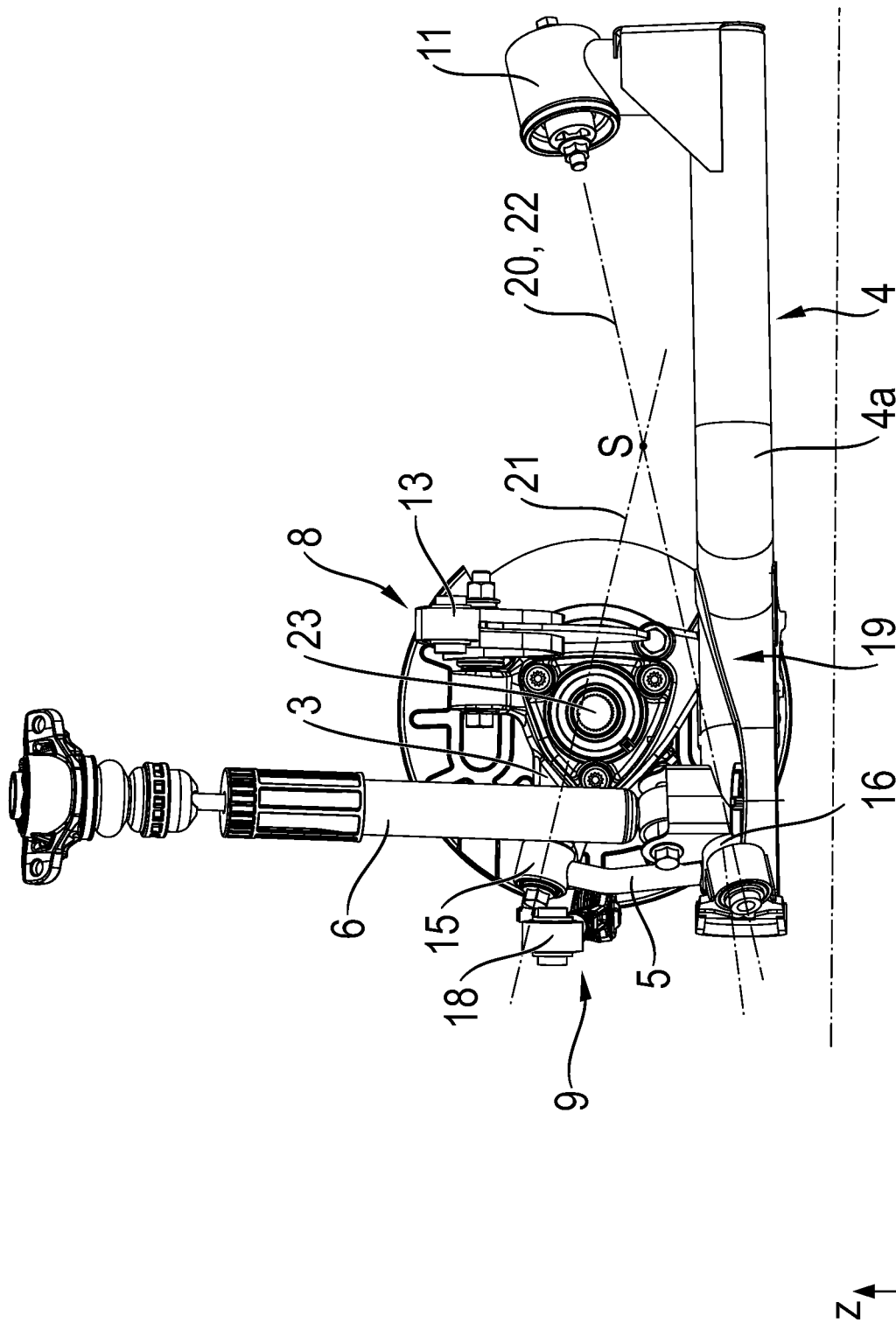
FIG. 3: A side view of part of the wheel suspension.

From FIG. 3 it can be seen that the wheel carrier 3 is also connected to the wheel-guiding control arm 4—in a second connection area—indirectly by way of an integral joint 5. The integral joint 5 is in the form of a so-termed two-point link such that an upper hinge 15 is connected to the wheel carrier 3 and a lower end is connected by way of a hinge 16 to the wheel-guiding control arm 4. The integral joint 5 extends essentially longitudinally. Otherwise than with a purely linear extension, however, the integral joint 5 is slightly curved in an approximately central area. According to the representation in FIG. 3, the axes 21, 22 of the hinges 15, 16 of the integral joint 5, when the wheel suspension 1 is viewed from the side, are directed so that they intersect at a point S ahead of the wheel center 23 relative to the longitudinal direction X of the vehicle. Viewing the wheel suspension 1 from the side, the axis 22 of the link-side hinge 16 of the integral joint 5 extends approximately parallel to the rotational axis 20 of the wheel-guiding control arm 4.

According to the representation shown in FIG. 2, when the wheel suspension 1 is viewed from above, the axes 21, 22 of the hinges 15, 16 of the integral joint 5 are orientated approximately parallel to the rotational axis 20 of the wheel-guiding control arm 4. Thanks to this orientation of the hinge axes of the integral joint, a further reduction of the secondary spring rate of the wheel suspension 1 is achieved, since the bearings used for the integral joint, which are preferably in the form of elastomer bearings, undergo hardly any cardanic loading. Both the useful life of the elastomer bearings and also the driving comfort are increased thereby. Moreover, owing to the lower secondary spring rate a vehicle equipped with the wheel suspension 1 can be controlled in a better way.

The two (first and second) connection areas where the wheel carrier is connected to the wheel-guiding control arm are a distance apart from one another in the longitudinal direction x of the vehicle, as can be seen in FIG. 3. Because of this, rotation of the wheel carrier 3 about the wheel axis is avoided, so that the integral joint 5 arranged in the second connection area serves as a supporting element. As can be seen from FIG. 3, the first connection area 19 is positioned ahead of the wheel center 23 whereas the second connection area formed by the integral joint 5 is behind the wheel center 23—in each case relative to the longitudinal direction X of the vehicle. In the undeflected condition of the wheel carrier 3, the integral joint 5 extends essentially in the vertical direction Z of the vehicle.

As can be seen most clearly in FIGS. 1 and 2, the wheel carrier 3 is additionally connected with the axle carrier 2 by way of a camber link 8. The camber link 8 is a two-point link in the shape of a flattened "C". An end of the camber link 8 directed toward the axle carrier 2 is articulated to the axle carrier 2 by means of a body-side hinge 13. An end of the camber link 8 directed toward the wheel carrier is articulated to the wheel carrier 3 by means of a hinge 14 on the wheel carrier side. Compared with the wheel-guiding control arm 4, which is positioned in an imaginary lower link plane, the camber link 8 can be associated with a link plane higher than that.

The described indirect and direct coupling of the wheel carrier to the wheel-guiding control arm 4, together with the connection by way of the camber link 8, enable the wheel carrier 3 to pivot relative to the wheel-guiding control arm 4 about a virtual steering axis that passes through the points 19 and 14. When such steering movement takes place, the integral link 5 pivots about the axis 22 of the control-arm-side hinge 16, and to control this steering movement of the wheel suspension 1 steering means 9 are provided. In the example embodiment shown, these means consist of a track control link 9 which, for active steering, can be actuated by an actor (not illustrated further). The track control link 9 is a two-point link component, which at its end on the outside of the vehicle is articulated by way of a track hinge 17 positioned behind the wheel center 23. Alternatively, in accordance with a different design (not shown here) the track control link 9 could engage directly with the integral link 5 a distance away from its hinge 16 on the control-arm side.

As can be seen from FIGS. 1 and 2, a spring 7 and a damper 6 are associated with the wheel-guiding control arm 4. In each case these extend essentially in the vertical direction z of the vehicle and are each supported at their respective lower ends by the wheel-guiding control arm 4. Viewing the wheel suspension 1 from above as in FIG. 2, the spring 7 and the damper 6 are arranged between the axle carrier 2, the camber link 8, the wheel carrier 3 and the track control link 9.

Figure 5:
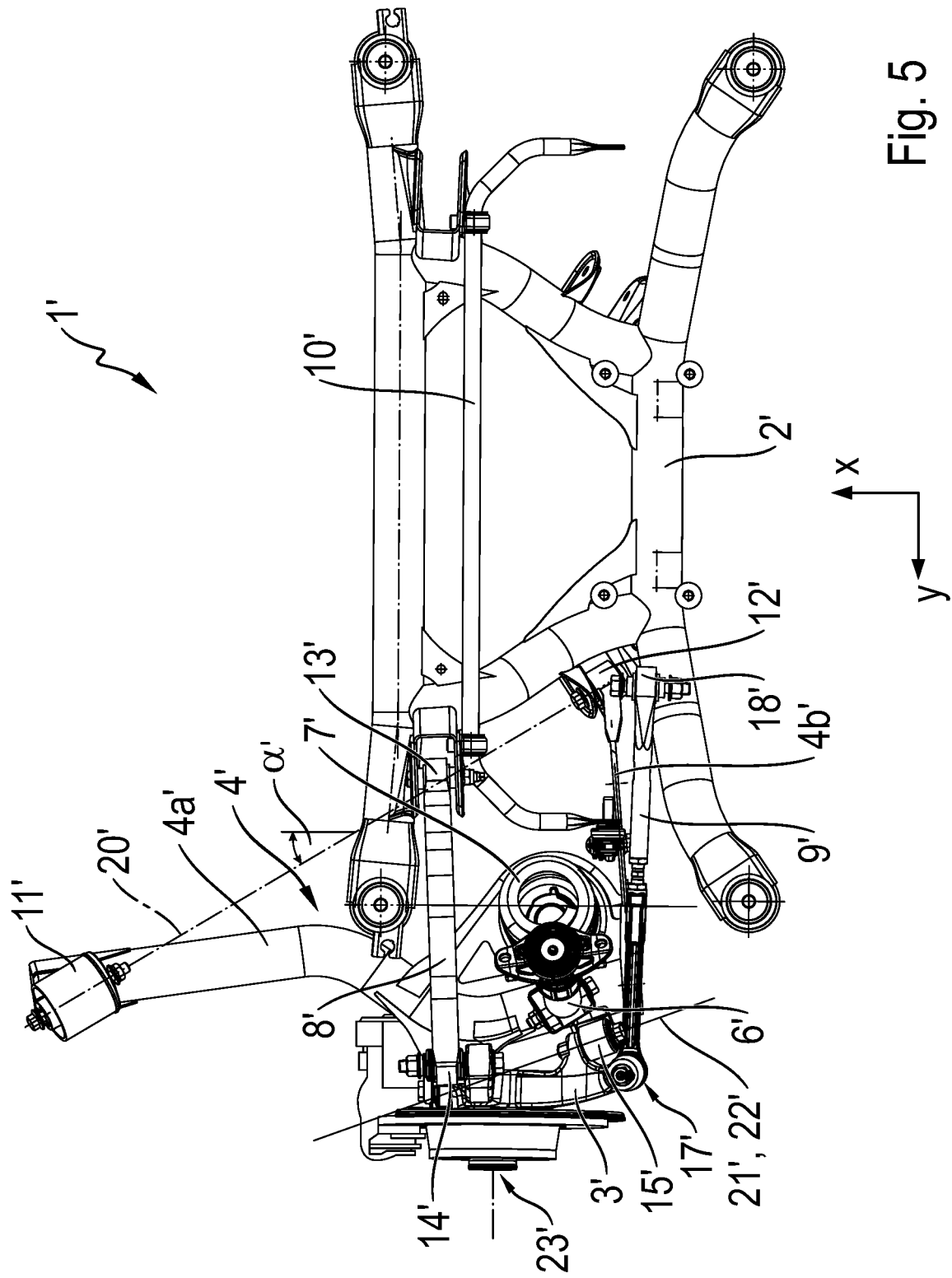

Finally, FIG. 5 shows a view from above, of a wheel suspension 1' according to a second example embodiment of the invention. The wheel suspension 1' according to the second example embodiment resembles the wheel suspension 1 of the first embodiment in many respects. Accordingly, to avoid repetitions only those characteristics which are different will be explained below.

In the wheel suspension 1' of the second embodiment, the rear body-side bearing 12' has a particular orientation, in that it is directed parallel to the rotational axis 20' that runs between the middle of the forward body-side bearing 11' and the rear body-side bearing 12'. Thus, the bearing axis of the rear body-side bearing 12' is not at a right-angle to the main extension direction of the transverse control arm section 4b', but instead encloses with it an angle smaller than 90°. Thus, from the practical standpoint the bearing axis of the rear body-side bearing 12' made as a ball-and-socket joint coincides with the rotational axis of the wheel-guiding control arm 4'. By virtue of this arrangement it can be ensured that during compression and expansion the ball-and-socket joint 12' is subjected to a smaller cardanic angle. As with the previous embodiment, the wheel-guiding control arem 4 has a longitudinal control arm section 4a'.

INDEXES

1 Wheel suspension according to the first example embodiment
1' Wheel suspension according to the second example embodiment
2 Axle carrier
3 Wheel carrier
4 Wheel-guiding control arm
4a Longitudinal control arm section
4b Transverse control arm section
5 Integral link
6 Damper
7 Spring
8 Camber link
9 Track control link
10 Stabilizer
11 Forward hinge
12 Rear hinge
13 Body-side hinge
14 Wheel-carrier-side hinge
15 Wheel-carrier-side hinge
16 Link-side hinge
17 Track hinge
18 Inner hinge
19 Hinge holder on the wheel carrier
20 Axis
21 Axis
22 Axis
23 Wheel center
S Intersection point
α, β Inclination angle
x Longitudinal direction of the vehicle
y Transverse direction of the vehicle
z Vertical direction of the vehicle

The invention claimed is:

1. A wheel suspension for a motor vehicle comprising:
a wheel carrier that is pivotally mounted relative to a wheel-guiding control arm,
the wheel-guiding control arm having a longitudinal control arm section with a forward body-side bearing and a transverse control arm section with a rear body-side bearing,
wherein the rear body-side bearing is in a form of a ball joint, and an integral joint is connected, at one end, to the wheel carrier by a first hinge and, at the other end, to the wheel-guiding control arm by a second hinge, and
when the wheel suspension is viewed from a transverse side, axes of the first and the second hinges of the integral joint intersect at a point located ahead of a wheel center in relation to a longitudinal direction of the vehicle, and when viewed from the transverse side, the axis of the second hinge of the integral joint, on a link side, is directed substantially parallel to a rotational axis of the wheel-guiding control arm.

2. The wheel suspension according to claim 1, wherein the wheel-guiding control arm is essentially L-shaped, the longitudinal control arm section forms a longer arm of the "L" and the transverse control arm section forms a shorter arm of the "L".

3. The wheel suspension according to claim 1, wherein, relative to a transverse direction of the vehicle, the rear body-side bearing of the wheel-guiding control arm is closer to a middle of the vehicle than the forward body-side bearing such that a rotational axis of the wheel-guiding control arm is inclined by an angle relative to a longitudinal direction of the vehicle.

4. The wheel suspension according to claim 1, wherein the rear body-side bearing is orientated parallel to a rotational axis of the wheel-guiding control arm that runs through the forward and the rear body-side bearings.

5. The wheel suspension according to claim 1, wherein the wheel-guiding control arm is connected, by the rear body-side bearing, to an axle carrier and, by the forward body-side bearing, to a vehicle body.

6. The wheel suspension according to claim 1, wherein in relation to a longitudinal direction of the vehicle, the transverse control arm section of the wheel-guiding control arm has substantially greater elasticity than in either vertical or transverse directions of the vehicle.

7. The wheel suspension according to claim 1, wherein the wheel carrier is connected to the wheel-guiding control arm:
   directly by a ball joint in a first connection area, and
   indirectly by an integral joint in a second connection area.

8. The wheel suspension according to claim 7, wherein the first and the second connection areas are spaced apart from one another in a longitudinal direction of the vehicle, with one of the first and the second connection areas ahead of a wheel center and the other one of the first and the second connection areas behind the wheel center.

9. The wheel suspension according to claim 7, wherein the integral joint substantially extends, in an undeflected condition of the wheel carrier, in a vertical direction of the vehicle.

10. The wheel suspension according to claim 1, wherein, when the wheel suspension is viewed from above, axes of the first and the second hinges of the integral joint extend substantially parallel to a rotational axis of the wheel-guiding control arm.

11. The wheel suspension according to claim 1, wherein the wheel carrier is additionally connected to an axle carrier by a camber link, and the camber link is associated with an upper link plane while the wheel-guiding control arm is associated with a link plane lower than the upper link plane.

12. The wheel suspension according to claim 1, wherein the wheel suspension is associated with steering means which are articulated to the wheel carrier behind a wheel center in a longitudinal direction of the vehicle.

13. The wheel suspension according to claim 12, wherein the steering means are designed as a track control link which is configured to be actuate for active steering.

14. The wheel suspension according to claim 12, wherein the steering means are designed as a track rod for passive steering by way of the wheel stroke.

15. A wheel-guiding control arm, for mounting a wheel carrier of a wheel suspension, comprising:
   a longitudinal control arm section with a forward body-side bearing and a transverse control arm section with a rear body-side bearing,
   wherein the rear body-side bearing is a ball joint and an integral joint is connected, at one end, to the wheel carrier by a first hinge and, at the other end, to the wheel-guiding control arm by a second hinge, and
   when the wheel suspension is viewed from a transverse side, axes of the first and the second hinges of the integral joint intersect at a point located ahead of a wheel center in relation to a longitudinal direction of the vehicle, and when viewed from the transverse side, the axis of the second hinge of the integral joint, on a link side, is directed substantially parallel to a rotational axis of the wheel-guiding control arm.

16. A wheel suspension for a wheel of a motor vehicle, the wheel suspension comprising:
   a wheel carrier that is coupled to a wheel-guiding control arm such that the wheel carrier is pivotable relative to the wheel-guiding control arm;
   the wheel-guiding control arm having a longitudinal control arm section and a transverse control arm section, and the longitudinal control arm section being aligned in a longitudinal direction of the vehicle and the transverse control arm section being aligned in a transverse direction of the vehicle;
   the longitudinal control arm section having one end fixed to one end of the transverse control arm section such that the wheel-guiding control arm is L-shaped, and an opposite end of the longitudinal control arm section having a forward body-side bearing and an opposite end of the transverse control arm section having a rear body-side bearing designed as a ball joint; and
   an integral joint is connected, at one end, to the wheel carrier by a first hinge and, at the other end, to the wheel-guiding control arm by a second hinge, and
   when the wheel suspension is viewed from a transverse side, axes of the first and the second hinges of the integral joint intersect at a point located ahead of a wheel center in relation to a longitudinal direction of the vehicle, and when viewed from the transverse side, the axis of the second hinge of the integral joint, on a link side, is directed substantially parallel to a rotational axis of the wheel-guiding control arm.

* * * * *